US012052805B2

(12) United States Patent
Lopez Julia et al.

(10) Patent No.: US 12,052,805 B2
(45) **Date of Patent: *Jul. 30, 2024**

(54) MICRO-LED AMPLITUDE CONTROL SYSTEM

(71) Applicant: Lumileds LLC, San Jose, CA (US)

(72) Inventors: Antonio Lopez Julia, Eindhoven (NL); Ronald Johannes Bonne, Plainfield, IL (US); Zhi Hua Song, Palo Alto, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,705

(22) Filed: Jun. 1, 2023

(65) Prior Publication Data

US 2023/0389151 A1 Nov. 30, 2023

Related U.S. Application Data

(63) Continuation of application No. 17/724,839, filed on Apr. 20, 2022, now Pat. No. 11,716,800, which is a (Continued)

(51) Int. Cl.
*G09G 3/32* (2016.01)
*H05B 45/325* (2020.01)
*H05B 45/37* (2020.01)

(52) U.S. Cl.
CPC ........... *H05B 45/325* (2020.01); *H05B 45/37* (2020.01)

(58) Field of Classification Search
CPC ........ H05B 45/10; H05B 45/14; H05B 45/30; H05B 45/31; H05B 45/325; H05B 45/44;
(Continued)

(56) References Cited

U.S. PATENT DOCUMENTS 11,343,890 B2 5/2022 Lopez Julia et al.
11,716,800 B2 8/2023 Lopez Julia et al.
(Continued)

FOREIGN PATENT DOCUMENTS

CN 115380321 11/2022
JP 7387876 11/2023
(Continued)

OTHER PUBLICATIONS

"Korean Application Serial No. 10-2022-7009174, Notice of Preliminary Rejection mailed Nov. 7, 2023", with English translation, 17 pages.

(Continued)

*Primary Examiner* — Thai Pham
(74) *Attorney, Agent, or Firm* — Schwegman, Lundberg & Woessner, P.A.

(57) ABSTRACT

A control system for an LED array relies on defining a first and a second group of separately addressed LED pixels, with the first group including pixels with an average current no less than the current at a Q point and a second group including pixels with an average current less than the current at a Q point. An amplitude signal provided to the first group of separately addressed LED pixels is selectively modulated, while providing a DC mode 100% duty cycle. An amplitude signal provided to the second group of separately addressed LED pixels is fixed, and a modulated duty cycle is provided.

19 Claims, 8 Drawing Sheets

Related U.S. Application Data continuation of application No. 16/997,058, filed on Aug. 19, 2020, now Pat. No. 11,343,890.

(60) Provisional application No. 62/890,853, filed on Aug. 23, 2019.

(58) Field of Classification Search
CPC .......... H05B 45/46; H05B 45/52; G09G 3/32; G09G 3/3225; G09G 3/3233; G09G 3/34; G09G 3/3406
See application file for complete search history.

(56) References Cited

U.S. PATENT DOCUMENTS

| | | | | |
|---|---|---|---|---|
| 2006/0006821 | A1* | 1/2006 | Singer .................... | H05B 45/22 315/312 |
| 2012/0086701 | A1 | 4/2012 | Vaeaenaenen et al. | |
| 2016/0128150 | A1 | 5/2016 | Ruan et al. | |
| 2018/0182279 | A1* | 6/2018 | Sakariya .............. | G09G 3/2088 |
| 2019/0053342 | A1 | 2/2019 | Shih et al. | |
| 2019/0132915 | A1* | 5/2019 | Xie ........................ | G09G 3/342 |
| 2021/0059027 | A1 | 2/2021 | Lopez et al. | |
| 2021/0193026 | A1* | 6/2021 | Xi ........................ | G09G 3/3233 |
| 2022/0248513 | A1 | 8/2022 | Lopez Julia et al. | |

FOREIGN PATENT DOCUMENTS

| | | |
|---|---|---|
| TW | 202116112 | 4/2021 |
| WO | 2021041160 | 3/2021 |

OTHER PUBLICATIONS

"Korean Application Serial No. 10-2022-7009174, Response filed Dec. 20, 2023 to Notice of Preliminary Rejection mailed Nov. 7, 2023", with English claims, 20 pages.
U.S. Appl. No. 16/997,058 U.S. Pat. No. 11,343,890, filed Aug. 19, 2020, Micro-LED Amplitude Control System.
U.S. Appl. No. 17/724,839 U.S. Pat. No. 11,716,800, filed Apr. 20, 2022, Micro-LED Amplitude Control System.
"International Application Serial No. PCT US2020 047246, International Search Report mailed Oct. 16, 2020", 4 pgs.
"International Application Serial No. PCT US2020 047246, Written Opinion mailed Oct. 16, 2020", 13 pgs.
"U.S. Appl. No. 16/997,058, Non Final Office Action mailed Oct. 15, 2021", 9 pgs.
"U.S. Appl. No. 16/997,058, Response filed Jan. 13, 2022 to Non Final Office Action mailed Oct. 15, 2021", 8 pgs.
"U.S. Appl. No. 16/997,058, Examiner Interview Summary mailed Jan. 21, 2022", 2 pgs.
"U.S. Appl. No. 16/997,058, Notice of Allowance mailed Feb. 7, 2022", 8 pgs.
"International Application Serial No. PCT US2020 047246, International Preliminary Report on Patentability mailed Mar. 3, 2022", 15 pgs.
"U.S. Appl. No. 17/724,839, Non Final Office Action mailed Sep. 21, 2022", 7 pgs.
"European Application Serial No. 20768156.0, Response to Communication pursuant to Rules 161(1) and 162 EPC filed Sep. 15, 2022", 47 pgs.
"U.S. Appl. No. 17/724,839, Response filed Dec. 13, 2022 to Non Final Office Action mailed Sep. 21, 2022", 7 pgs.
"U.S. Appl. No. 17/724,839, Examiner Interview Summary mailed Dec. 16, 2022", 2 pgs.
"U.S. Appl. No. 17/724,839, Notice of Allowance mailed Mar. 2, 2023", 8 pgs.
"European Application Serial No. 20768156.0, Communication Pursuant to Article 94(3) EPC mailed May 4, 2023", 7 pgs.
"Japanese Application Serial No. 2022-512747, Notification of Reasons for Rejection mailed Apr. 25, 2023", with English translation, 11 pages.
"U.S. Appl. No. 17/724,839, Corrected Notice of Allowability mailed Jun. 28, 2023", 2 pgs.
"Japanese Application Serial No. 2022-512747, Response filed Jul. 4, 2023 to Notification of Reasons for Rejection mailed Apr. 25, 2023", with English claims, 10 pages.
"European Application Serial No. 20768156.0, Communication Pursuant to Article 94(3) EPC mailed May 4, 2023".

* cited by examiner

MICRO-LED AMPLITUDE CONTROL SYSTEM

RELATED APPLICATION

This application is a continuation of U.S. patent application Ser. No. 17/724,839, filed on Apr. 20, 2022, which is a continuation of U.S. patent application Ser. No. 16/997,058, filed on Aug. 19, 2020, which claims the benefit of priority to U.S. Provisional Patent Application No. 62/890,853 titled "Micro-LED Amplitude Control System" and filed on Aug. 23, 2019, the contents of which are incorporated herein by reference in their entireties.

TECHNICAL FIELD

The present disclosure relates generally to a Micro-light emitting diode (LED) pulse width modulation (PWM) circuit and amplitude control system that improves image performance. The technique is usable in lighting systems based on large micro-LED pixel arrays.

BACKGROUND

Micro-LED arrays for display or imaging are an emerging technology in the lighting and display industry. A micro-LED array contains one or more arrays of thousands to millions of microscopic LED pixels that actively emit light and can be individually controlled. Micro-LEDS can have higher brightness and better energy efficiency than conventional liquid crystal display (LCD) or organic LED (OLED) displays, making them attractive for applications such as television, automotive headlight, mobile phones, home, building, or architectural lighting.

To display an image, electrical current levels of individual micro-LED pixels at different locations on an array are adjusted. A pulse width modulation (PWM) control system that turns on and off the pixels at a certain frequency can be used. Typically, each LED module is driven by a PWM current source that switches on and off at a certain frequency and with a certain ratio of turn-on time to the period, often called a duty cycle. During PWM operation, the average direct current (DC) through a pixel is the product of the electrical current amplitude and the ratio between the conduction time and the period or cycle time, called the duty cycle, as described in the following equation:

$$I_{avg}=I_{ampi}\times D_i \qquad \text{(Equation 1)}$$

In the equation, $I_{avg}$ is the average pixel current, $I_{ampi}$ is the image amplitude, and $D_i$ is the pixel duty cycle. The PWM duty cycle and current amplitude of the current sources may be different to achieve individual control of each LED module required by applications. In a conventional PWM based imaging technology, a system control unit determines the duty cycle value of each pixel based on an image and sends them through the image data frame to the LED pixels, a pixel control unit, and various driver circuits. The electrical current amplitude can be kept identical for all pixels and may vary between different images. Therefore, the individual duty cycle sets the pattern of the image, whereas the amplitude is either a constant or a collective variable to adjust the brightness of the whole array, providing global dimming. The dimming function can also be achieved by adjusting the duty cycle.

Unfortunately, this type of conventional PWM dimming can result in inefficient power utilization when a selected current density does not match the current density that provides peak external quantum efficiency (EQE). EQE is a measure of the ratio of the number of photons emitted from the LED to the number of electrons passing through the device. Low EQE for a device can be of particular importance for large matrix pixel arrays of LEDs that already face severe power problems. Individual light intensity of thousands of emitting pixels may need to be controlled with power efficient techniques that minimize wasted power usage and reduce adverse heating effects.

SUMMARY

In one embodiment, a control system for an LED array relies on defining a first and a second group of separately addressed LED pixels, with the first group including pixels with an average current no less than the current at a Q point and a second group including pixels with an average current less than the current at a Q point. An amplitude signal provided to the first group of separately addressed LED pixels is selectively modulated, while further providing fixed duty cycle pulse width modulated signals. In some embodiments the duty cycle can be a DC mode 100% duty cycle. An amplitude signal provided to the second group of separately addressed LED pixels is fixed, and a modulated duty cycle is further provided.

In some embodiments, the separately addressed LED pixels further comprise a matrix pixel array.

In some embodiments, the amplitude signal of the first group is set at $I_{ampi}\times D_i$.

In some embodiments, the amplitude signal of the second group is set at the Q point and the duty cycle is set at $D_i\times I_{ampi}/IQ$.

In some embodiments, additional groups of separately addressed LED pixels are determined, each group having a defined amplitude.

In some embodiments, a control system for an LED array includes a first and a second group of separately addressed LED pixels and a DAC module able to selectively adjust amplitude signals. A pulse width modulator acting with the DAC module can be used to supply the first group of LED pixels with a first signal corresponding to fixed duty cycle and a modulated amplitude. In some embodiments the duty cycle can be a DC mode 100% duty cycle. The second group of LED pixels is supplied with a second signal modulated to maintain an unchanged average pixel current to the LED pixels by setting the signal amplitude with the DAC module and modulating the duty cycle.

In some embodiments, the DAC module further includes multiple DAC units. The DAC module can be configured to selectively adjust an amplitude signal provided to each of the multiple groups of separately addressed LED pixels.

In some embodiments, the separately addressed LED pixels present an image provided by an image processing unit.

In some embodiments, multiple groups of separately addressed LED pixels are determined.

In some embodiments, the second group has the amplitude signal fixed lower than the amplitude signal provided to the first group. The second group can also have amplitude fixed to approach peak EQE efficiency and lower overall system power usage.

In some embodiments, a control method for an LED array includes providing a first and a second group of separately addressed LED pixels. The first group is supplied with pulse width modulated signals corresponding to a fixed duty cycle and a modulated amplitude signal. In some embodiments the fixed duty cycle is a DC mode 100% duty cycle. The second group is supplied with a pulse width modulated signals corresponding to a modulated duty cycle and a fixed amplitude signal. Additional groups of separately addressed LED pixels can be determined, each group having a defined amplitude.

DETAILED DESCRIPTION

Various techniques, devices, or systems can be used to improve overall power efficiency for a micro-LED array system. For example, in some embodiments respective subsets of high lumen pixels can be driven using a different PWM electrical current amplitude. Yet another technique involves defining multiple amplitude steps appropriate for various pixel groupings. In addition to modifying LED pixel operation, optimum operating current for minimizing total power losses can be shifted after accounting for pixel driver and interconnect design. Use of these techniques, devices or systems can provide a lower minimum average current due to smaller amplitude and effectively increase the dynamic current range of the array.

Figure 1A:
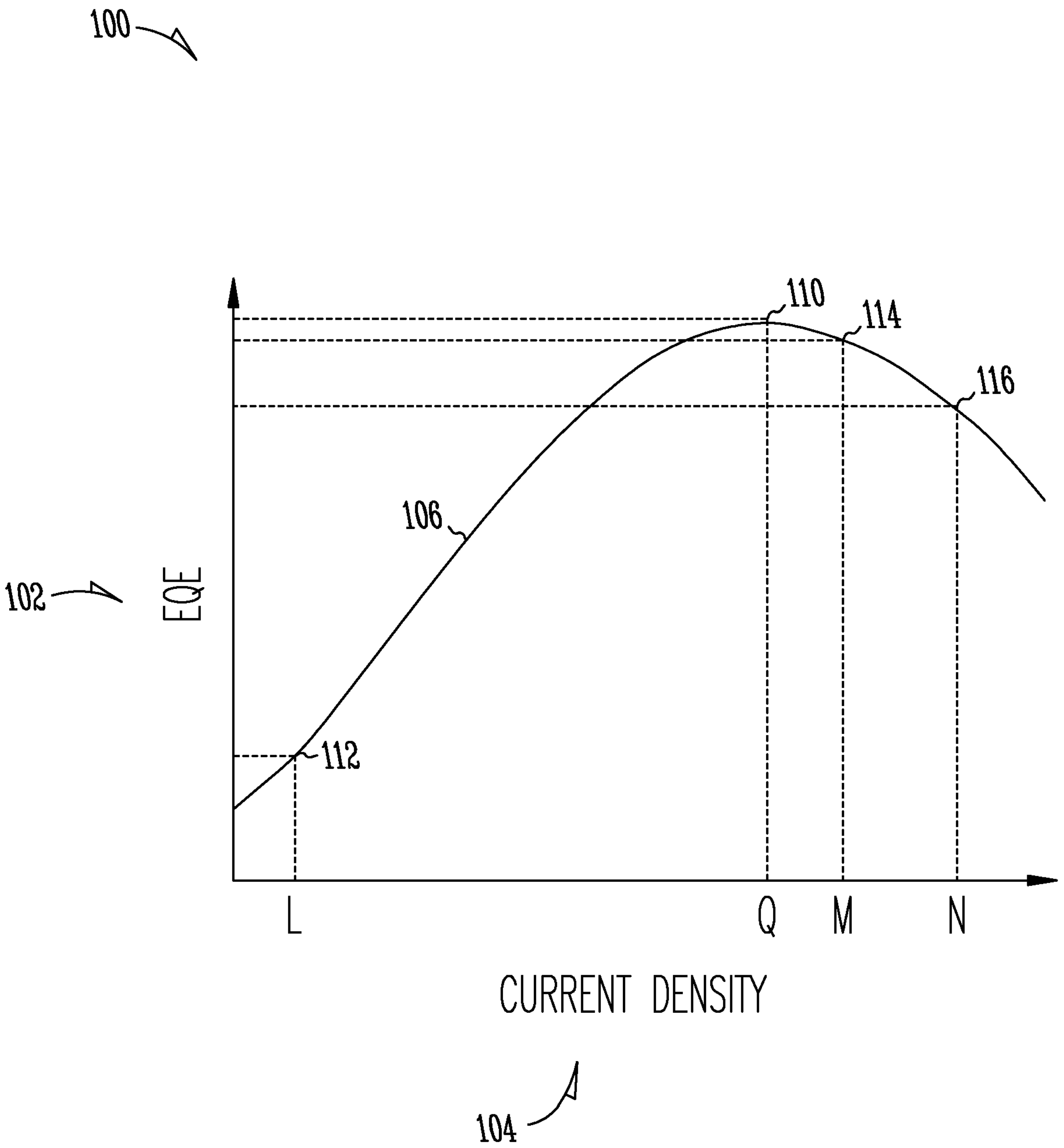
FIG. 1A illustrates a conventional graph with an EQE vs. current density curve.

Some of these improved power efficiency techniques are contrasted with respect to graph 100 of FIG. 1A, which helps illustrate how conventional PWM dimming for LEDs may not necessarily operate with the highest efficiency. An external quantum efficiency (EQE), shown as axis 102, is a parameter that can help to determine LED efficiency. The EQE is a function of the LED current density, shown as axis 104.

Typically, the larger the EQE value, the higher the efficiency. The graph 100 of FIG. 1A illustrates an example of an EQE vs. current density curve. In this example, a curve 106 has an EQE with a peak referred to as the Q point 110 of the current density. EQE values at current density less than that at the Q point 110, such as at L point 112, or at current density greater than that at the Q point 110, such as M point 114 and N point 116, the EQE decreases. If a PWM control system selects a current amplitude corresponding to a current density (equal to the electrical current amplitude over pixel area) at the Q point 110, the efficiency of the pixel array is optimized. In many applications, however, this is often not the case. To achieve maximum power and light output within a limited LED die area, the PWM amplitude is often designed to let the density fall at M point 114 or even N point 116 rather than Q point 110. Since the amplitude is same for all LED pixels in prior micro-LED arrays, all the pixels run less efficiently than they are able to.

As previously noted, improved power efficiency can be realized in one embodiment by having a subset of high lumen pixels in a pixel matrix be driven using a different PWM current amplitude than another subset of pixels of the array. In order to accurately present an image, the operation mode for the highest lumen pixels (a duty cycle of 100%) cannot be changed. High lumen pixels need to run in DC mode with the maximum amplitude or with maximum image amplitude. However, for pixels with a duty cycle less than one, it is possible to increase the duty cycle and reduce the amplitude while still maintaining the same average current required by image data.

Since the amplitude decreases, the current density can move towards the Q point 110 from the right side of curve 106 of FIG. 1A and the EQE can thus improve.

In some embodiments, the amplitude of each pixel individually may be adjusted towards the Q point 110 in FIG. 1A. In the meantime, the duty cycle can be modulated to maintain as unchanged the average pixel current. With reference to Equation (1), the image duty cycle and the EQE curve in FIG. 1, the pixels can be divided into two categories:

1) For pixels with an average current no less than the current at the Q point, or IQ: the amplitude can be modulated to $I_{ampi} \times D_i$ with the duty cycle fixed (e.g. at 80%, 90%, or 100%, a lesser percentage, or some percentage therebetween). In some embodiments, the duty cycle can be one (1), or DC mode. This is the maximum achievable modulation towards the Q point.
2) For pixels with an average current less than IQ: the amplitude can be fixed at IQ because further decreasing it to below IQ would lower the EQE. The duty cycle becomes $D_i \times I_{ampi}/IQ$.

In some embodiments, modifications to the system, including but not limited to changes in pixel driver and interconnects, may be used to shift the optimum operating current for the minimum total losses. For instance, changing the PWM signal to DC current of $I_{ampi} \times D_i$ will cause the resistive losses of interconnects to reduce from $I_{ampi}^2 \times D_i$ to $I_{ampi}^2 \times D_i^2$. This also means although the LED EQE peaks at the Q point in FIG. 1, the resistive losses keep decreasing with the average current beyond that point. Therefore, depending on the shape of the EQE curve relative to that of the resistive losses in a specific design, the optimum average current may shift from the Q point to a lower value.

Figure 1B:
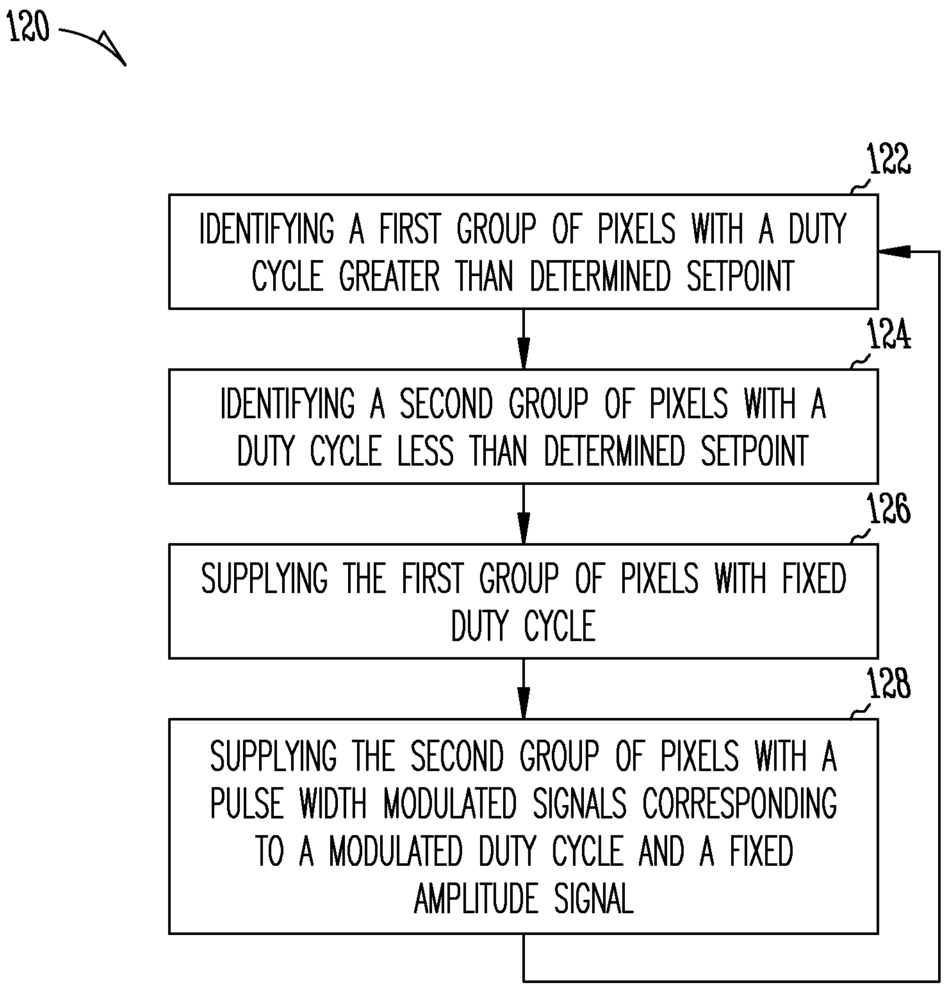
FIG. 1B is a flow chart illustrating a control procedure for an LED matrix array presenting an EQE vs. current density curve for individual pixels such as seen with respect to FIG. 1A.

FIG. 1B is a flow chart 120 illustrating a control procedure 120 for an LED matrix array presenting an EQE vs. current density curve for individual pixels such as seen with respect to FIG. 1A. Implementation of the control procedure 120 includes at least some pixels or groups of pixels in the LED matrix array be separately powered using a controllable duty cycle. The control procedure can be implemented to adjust power at startup, when an image changes, at predefined time intervals, or continuously. In some embodiments, PWM control can be provided externally, by controller or power die on a printed circuit board connected to an LED die, or on complementary metal oxide semiconductor (CMOS) or other die attached to the LED die.

As seen in flow chart 120, in step 122 a first group of pixels with an average current no less than the current at the Q point is identified. In step 124, a second group of pixels with an average current less than the current at a Q point is identified. In step 126 a selectively modulated amplitude signal is provided to the first group of pixels, such that a fixed duty cycle of pulse width modulated signals is provided. In step 128, an amplitude signal is fixed to provide to the second group of pixels a modulated duty cycle of pulse width modulated signals. This procedure can be repeated as necessary.

Figure 2A:
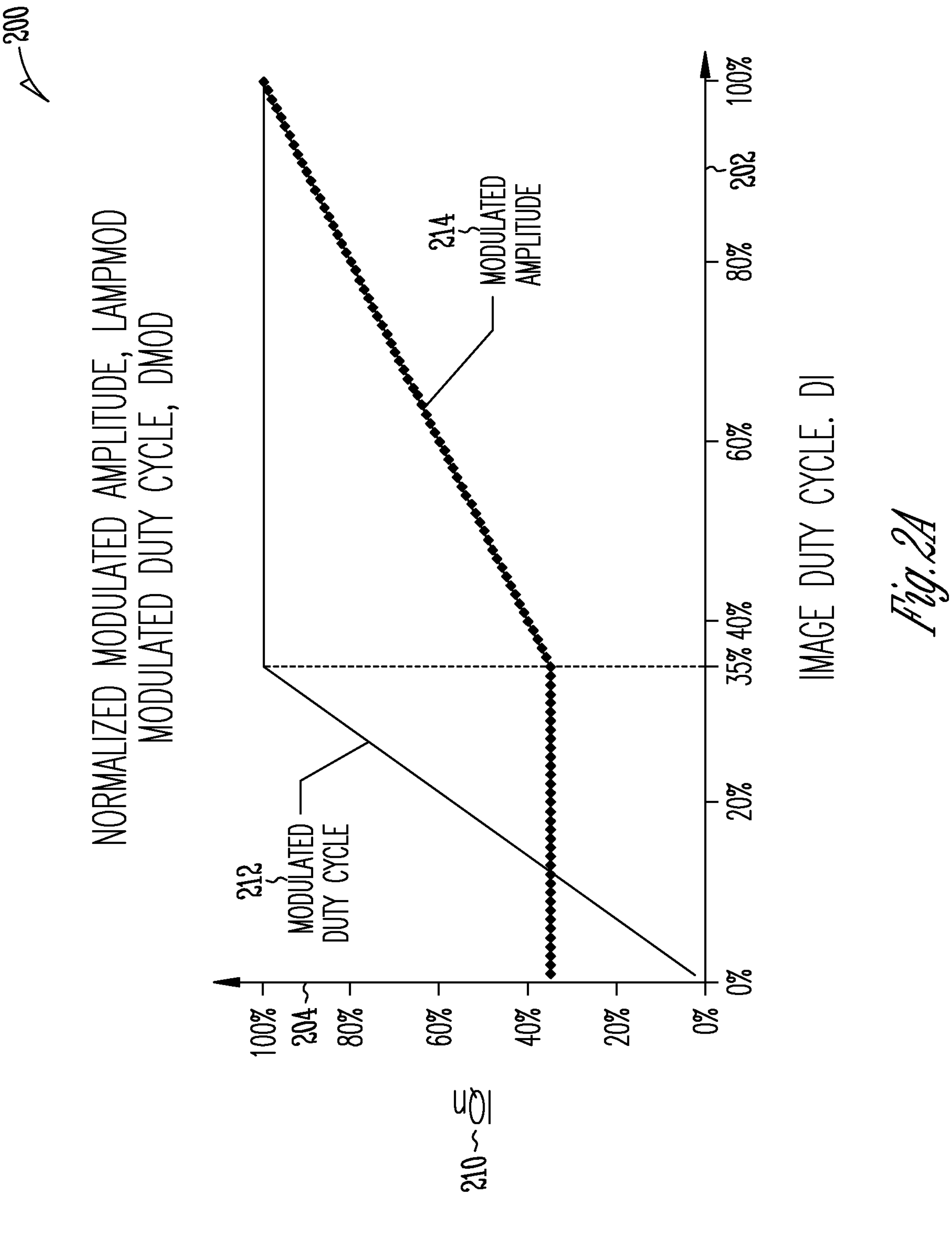
FIG. 2A is a graph illustrating a selectively modulated duty cycle and amplitude graph.
Figure 2B:
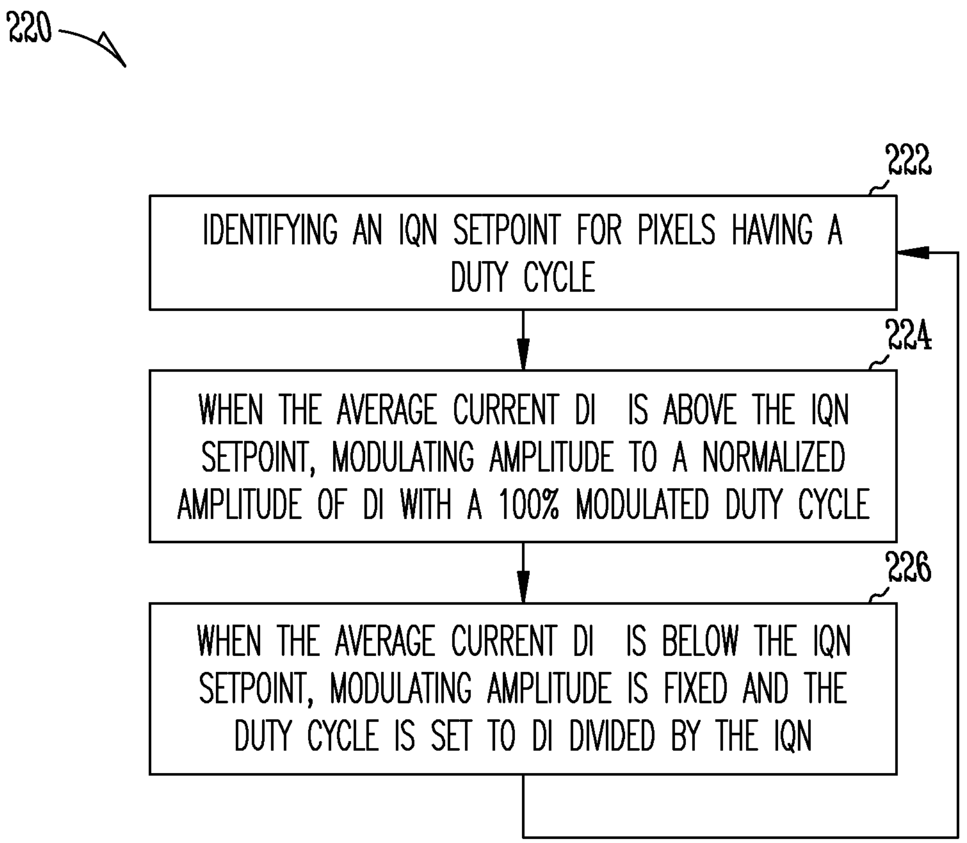
FIG. 2B is a flow chart illustrating a control procedure for an LED matrix array such as seen with respect to FIG. 2A.

Another implementation with individual, stepless pixel amplitude adjustment is described with respect to FIGS. 2A and 2B. A micro-LED array can be provided and have an image duty cycle ($D_i$, axis 202) with a range of 1% to 100% and a modulated duty cycle ($D_{mod}$, axis 204). $IQ_n$, the optimum amplitude where the EQE peaks (0.35) is normalized to the image amplitude. For simplification, only LED losses are considered. This is illustrated in graph 200 of FIG. 2A.

The following Table 1 illustrates specific example values for stepless pixel amplitude adjustment for the system illustrated with respect to FIG. 2A:

TABLE 1

| Image Duty Cycle, $D_i$ | Modulated amplitude, $I_{ampmod}$ (normalized to image amplitude) | Modulated duty cycle, $D_{mod}$ |
|---|---|---|
| $D_i \geq 35\%$ | $D_i$ | 100% |
| $D_i < 35\%$ | 0.35 | $D_i/0.35$ |

Since the current is normalized to the image amplitude, the normalized average current in Equation (1) becomes $1{*}D_i$, equaling to $D_i$. Therefore, as seen in FIG. 2A, for the modulated duty cycle 212 when the average current $D_L$ is above $IQ_n$ value of 0.35, the pixels run in DC mode with a normalized amplitude of $D_i$. When $D_i$ is below 35%, the modulated amplitude 214 is fixed at 0.35 and the duty cycle becomes $D_i/0.35$.

FIG. 2B is a flow chart 220 illustrating a control procedure 220 for an LED matrix array such as discussed with respect to FIG. 2A. Like the implementation discussed with respect to FIG. 1B, implementation of the control procedure 220 includes at least some pixels or groups of pixels in the LED matrix array be separately powered using a controllable duty cycle. The control procedure can be implemented to adjust power at startup, when an image changes, at predefined time intervals, or continuously. In some embodiments, pulse width modulation control can be provided externally, by controller or power die on a printed circuit board connected to an LED die, or on CMOS or other die attached to the LED die.

As seen in flow chart 220, in step 222 an $IQ_n$ setpoint is identified for pixels having a duty cycle. In step 224, when the average current $D_i$ for a pixel is above the $IQ_n$ setpoint, modulating amplitude is set to a normalized amplitude of $D_i$ with a 100% modulated duty cycle. In step 226, when the average current $D_i$ for a pixel is below the $IQ_n$ setpoint, the modulating amplitude is fixed and the duty cycle is set to $D_i$ divided by the $IQ_n$. This procedure can be repeated as necessary.

An alternative approach can be based on defining multiple amplitude steps between the image amplitude, corresponding to M point 114 or N point 116 in FIG. 1, and the optimum Q point 110. The pixels can be divided into several groups based on the image duty cycle, and each group can have one common amplitude value. For each pixel group, the amplitude modulation can be determined by operating pixels with the highest image duty cycle in DC mode. Otherwise, if the modulated amplitude further decreases, the average current of those brightest pixels within the group would be lower than the image level. The rest of the pixels can operate in PWM mode with modulated amplitude and duty cycle.

In one example, modulation of each pixel group can fall into one of two categories:

1) For a group whose brightest pixels have an average current no less than the optimum current IQ the amplitude can be modulated to $I_{ampi} \times D_{imax}$, with $D_{imax}$ being the maximum image duty cycle of that group. Accordingly, the duty cycle of each pixel is adjusted to $D_i/D_{imax}$, with $D_i$ being the image duty cycle of each pixel.
2) For a group whose brightest pixels have an average current less than IQ: the amplitude can be fixed at IQ. Accordingly, the duty cycle of each pixel is adjusted to $D_i \times I_{ampi}/IQ_n$ with $D_i$ being the image duty cycle of each pixel.

Figure 3A:
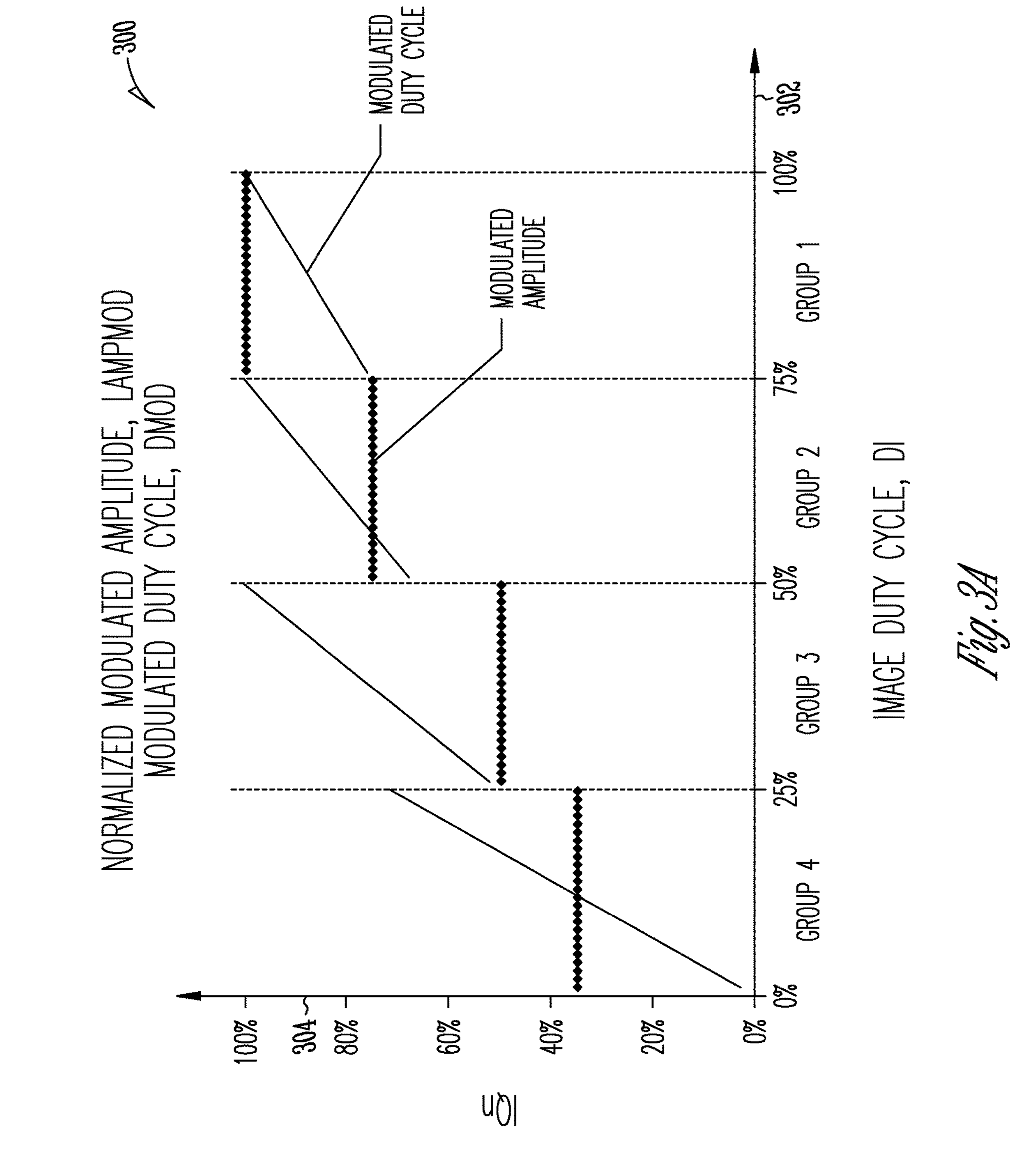
FIG. 3A is a graph illustrating a selectively modulated duty cycle and amplitude graph for various groupings.
Figure 3B:
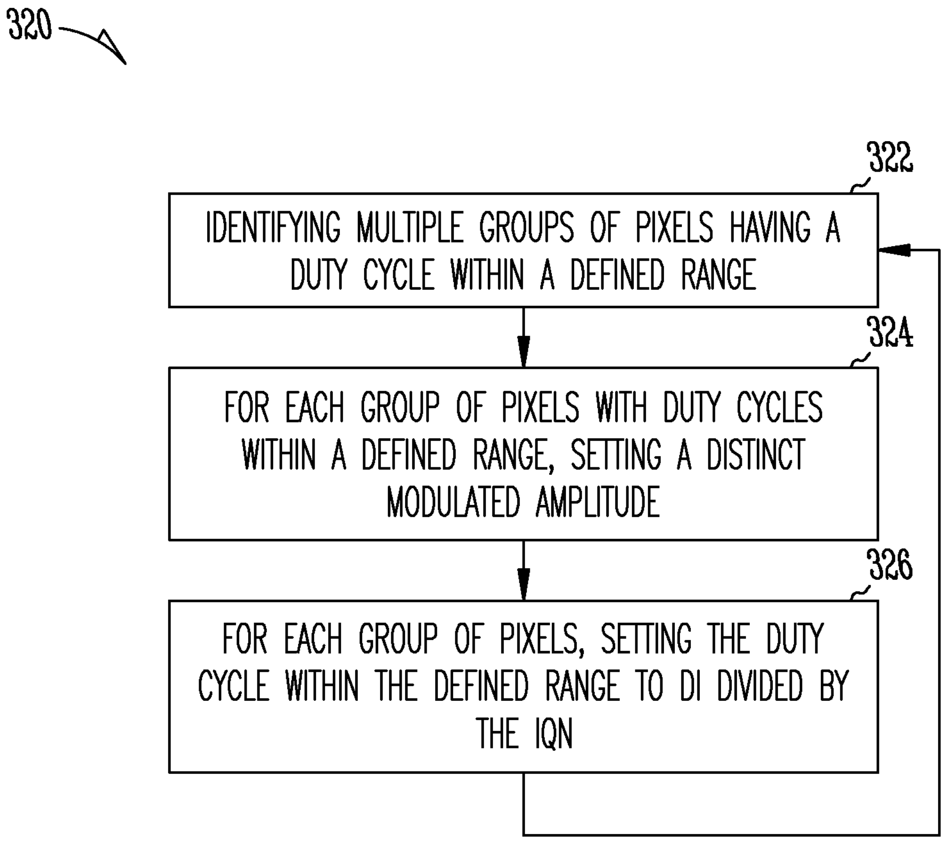
FIG. 3B is a flow chart illustrating a control procedure for an LED matrix array such as seen with respect to FIG. 3A.
Figure 4:
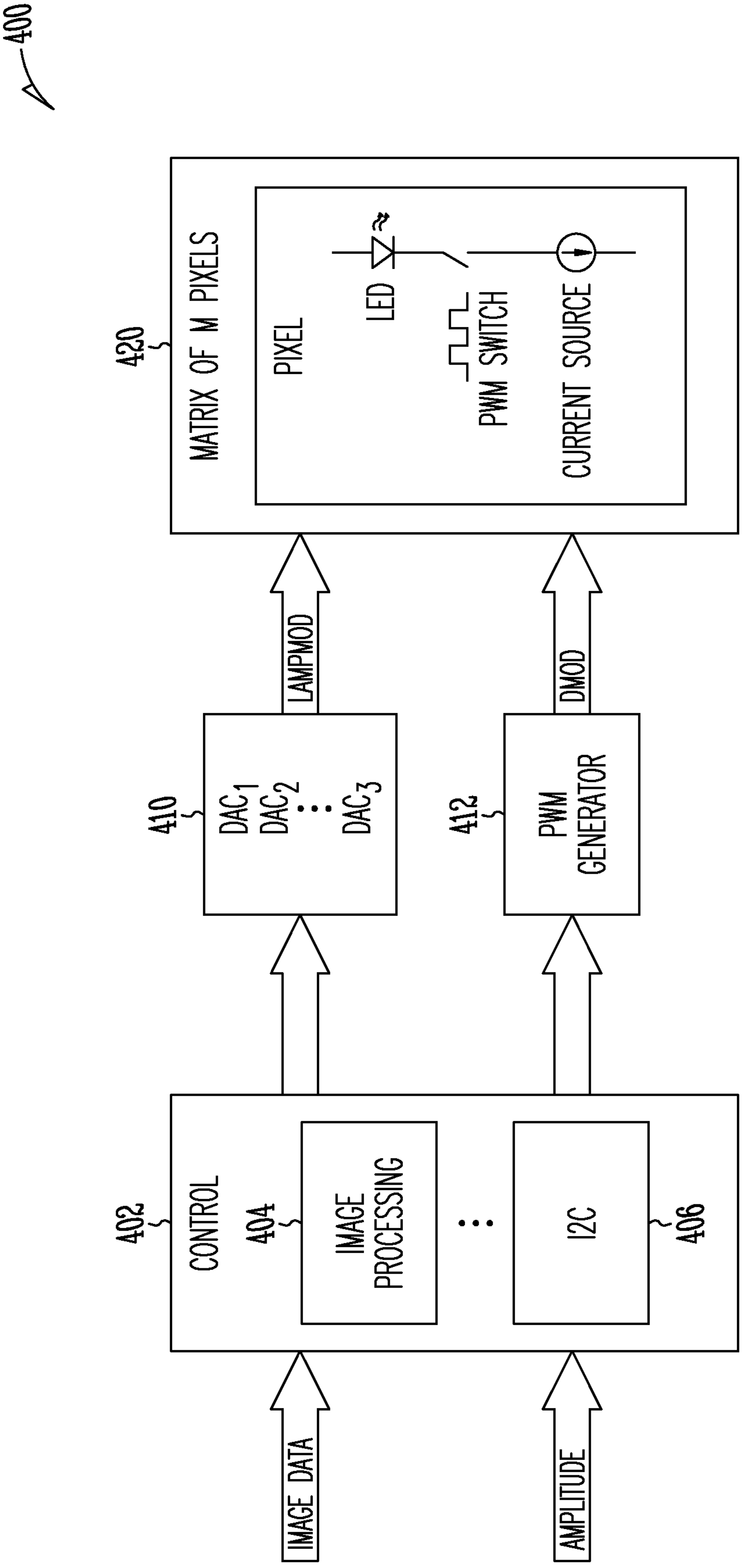
FIG. 4 is one embodiment of pixel matrix micro-LED array system with a PWM generator driven by an image processing module.

Since multiple group modulation relies on limited levels for amplitude modulation, computation may be simpler than that described with respect to FIGS. 3A, 3B, and 4 described elsewhere herein. However, the efficiency improvement may not be as great because some pixels within each group can be run in PWM rather than DC mode. As the steps increase to infinity, the two approaches would be identical.

FIG. 3A is a graph 300 illustrating a graph based on defining multiple amplitude steps for various pixel groupings. The following Table 2 illustrates specific example values for a step-based modulation approach with four (4) groups:

TABLE 2

| Group Number | Image Duty Cycle, $D_i$ | Modulated amplitude, $I_{ampmod}$ (normalized to image amplitude) | Modulated duty cycle, $D_{mod}$ |
|---|---|---|---|
| 1 | $75\% < D_i \leq 100\%$ | 1 | $D_i$ |
| 2 | $50\% < D_i \leq 75\%$ | 0.75 | $D_i/0.75$ |
| 3 | $25\% < D_i \leq 50\%$ | 0.5 | $D_i/0.5$ |
| 4 | $1\% < D_i \leq 25\%$ | 0.35 | $D_i/0.35$ |

As is apparent, Groups 1 through 3 have the same duty cycle increment of 25%, while group 4 has an increment of 24%. For group 1, 2 and 3, the modulated amplitude is the average electrical current of the brightest pixel within the group, being 1, 0.75 and 0.5, respectively. The respective modulated duty cycle is the average current $D_i$ divided by the modulated amplitude, being $D_i$, $D_i/0.75$ and Di/0.5. For group 4, because the $IQ_n$ value of 0.35 is bigger than the average current of the brightest pixel, 0.25, the amplitude is set at 0.35. The duty cycle becomes $D_i/0.35$. This is graphically illustrated by FIG. 3A.

FIG. 3B is a flow chart 320 illustrating a control procedure 320 for an LED matrix array, such as discussed with respect to FIG. 2A. Like the implementation discussed with respect to FIGS. 1B and 2B, implementation of the control procedure 320 includes at least some pixels or groups of pixels in the LED matrix array be separately powered using a controllable duty cycle. The control procedure can be implemented to adjust power at startup, when an image changes, at predefined time intervals, or continuously. In some embodiments, PWM control can be provided externally, by controller or power die on a printed circuit board connected to an LED die, or on CMOS or other die attached to the LED die.

As seen in flow chart 320, in step 322 multiple groups of pixels having a duty cycle within a defined range are identified. In step 322, the brightest pixels have a duty cycle set at 100% for a distinct modulated amplitude. In step 324, for each group of pixels, the duty cycle is set within the defined range to be $D_i$ divided by the $IQ_n$. This procedure can be repeated as necessary.

In the foregoing described embodiments, intensity can be separately controlled and adjusted by setting appropriate pulse widths for each LED pixel using a suitable lighting logic and control module and/or PWM module. This is illustrated with respect to FIG. 4, which illustrates a pixel matrix lighting control system 400 suitable for controlling a pixel matrix micro-LED array that can contain thousands to millions of microscopic LED pixels that actively emit light and are individually controlled. To emit light in a pattern or sequence that results in display of an image, the current levels of the micro-LED pixels at different locations on an array are adjusted individually according to a specific image.

Processing modules that facilitate efficient power usage in the system 400 are illustrated in FIG. 4. The system 400 includes a control module 402 able to implement pixel or group pixel level control of amplitude and duty cycle such as discussed using procedures described with respect to FIGS. 1A-B, FIGS. 2A-B, and FIGS. 3A-B. In some embodiments the system further includes an image processing module 404 to generate, process, or transmit an image, and digital control interfaces 406, such as inter-integrated circuit (I2C), serial peripheral interface (SPI), controller area network (CAN), universal asynchronous transmitter/receiver (UART), or the like, that are configured to transmit needed control data or instructions. The digital control interfaces 406 and control module 402 may include the system microcontroller and any type of wired or wireless module configured to receive a control input from an external device. By way of example, a wireless module may include bluetooth, Zigbee, Z-wave, mesh, WiFi, near field communication (NFC) and/or peer to peer modules may be used. The microcontroller may be any type of special purpose computer or processor that may be embedded in an LED lighting system and configured or configurable to receive inputs from the wired or wireless module or other modules in the LED system and provide control signals to other modules based thereon. Algorithms implemented by the microcontroller or other suitable control module 402 may be implemented in a computer program, software, or firmware incorporated in a non-transitory computer-readable storage medium for execution by the special purpose processor. Examples of non-transitory computer-readable storage mediums include a read only memory (ROM), a random access memory (RAM), a register, cache memory, and semiconductor memory devices. The memory may be included as part of the microcontroller or may be implemented elsewhere, either on or off a printed circuit or electronics board The term module, as used herein, may refer to electrical and/or electronic components disposed on individual circuit boards that may be soldered to one or more electronics boards. The term module may, however, also refer to electrical and/or electronic components that provide similar functionality, but which may be individually soldered to one or more circuit boards in a same region or in different regions.

As will be appreciated, in some embodiments a modulation computation may be done by the control module 402 through directly generating a modulated image. Alternatively, a standard image file can be processed or otherwise converted to provide modulation. Image data that mainly contains PWM duty cycle values is processed for all pixels in image processing module 404. Since amplitude is a fixed value or rarely changed value, amplitude related commands can be given separately through a digital interface, such as a wired or wireless interface previously discussed. The control module 402 interprets digital data, which can then be used by PWM generator 412 to generate modulated PWM signals, $D_{mod}$, for pixels, and by DAC module 410 to generate the control signals for obtaining the required current source amplitude. Next, the modulated amplitude and PWM duty cycle are coupled to the pixel matrix 420 that contains m pixel units. Each pixel unit is composed of the micro-LED, a PWM switch with the modulated duty cycle, and a current source with the modulated amplitude.

In some embodiments, the DAC module 410 may contain multiple DAC units, with the total number of n and no more than the total number of pixels, m. Modulation resolution or steps determine the number of bits needed for operation of the DAC module 410. Finer resolution or increasing number of amplitude steps can require more bits and a larger DAC module. For instance, the amplitude partition method illustrated with respect to FIGS. 2A-2B can include multiple 2-bit DAC units, whereas a more complex grouped amplitude scheme as illustrated with respect to FIGS. 3A-3B can include more bits and consume more processing power.

Figure 5:
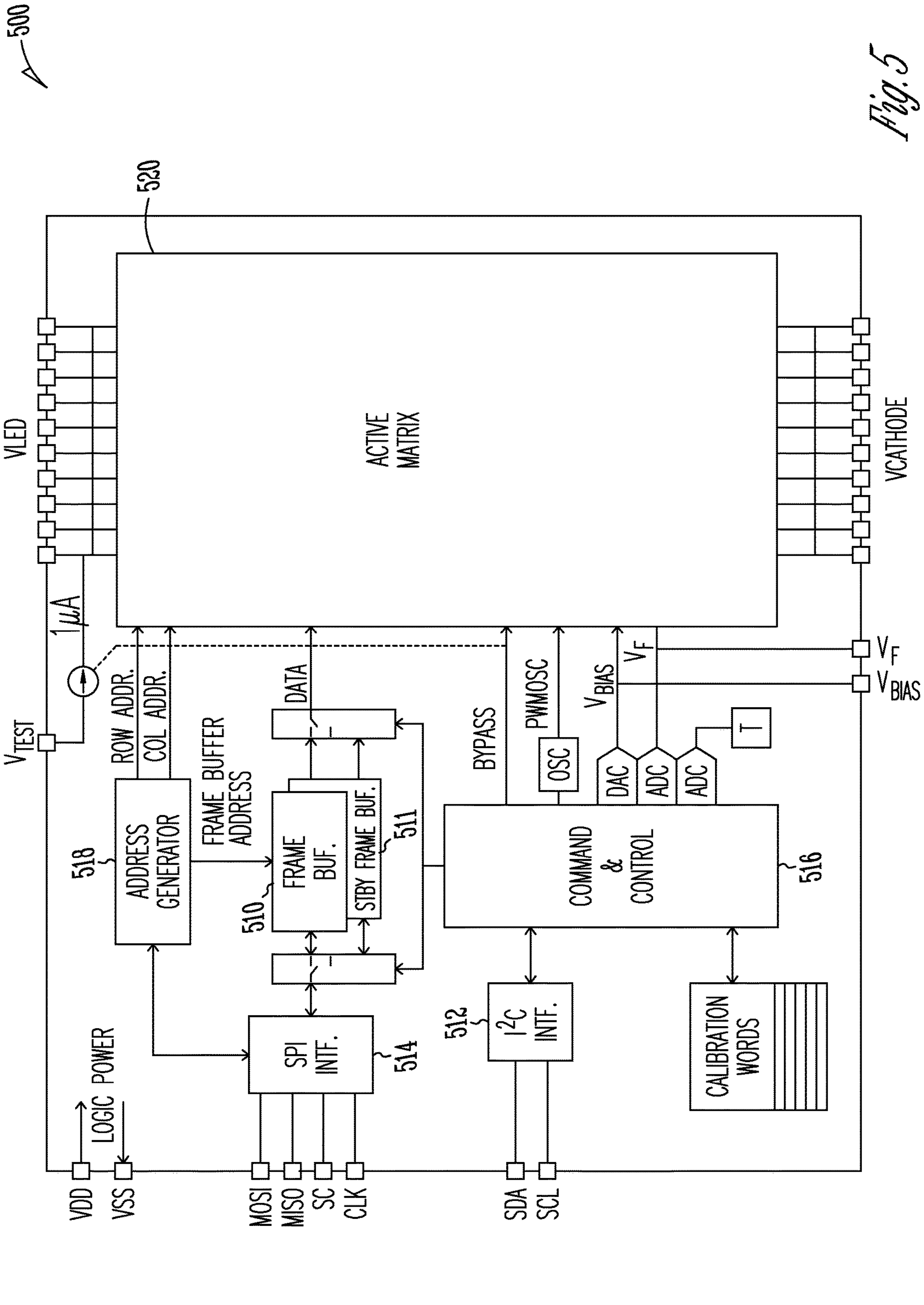
FIG. 5 is one embodiment of a chip level implementation of a matrix micro-LED array system such as discussed with respect to FIG. 4.

FIG. 5 illustrates in more detail an embodiment of a chip-level implementation of a system 500 supporting functionality, such as discussed with respect to FIG. 4. The system 500 includes a command and control module 516 able to implement pixel or group pixel level control of amplitude and duty cycle for circuitry and procedures such as discussed with respect to FIG. 1B, FIG. 2B, FIG. 3B, and FIG. 4. In some embodiments, the system 500 further includes a frame buffer 510 for holding generated or processed images that can be supplied to an active LED matrix 520. Other modules can include digital control interfaces such as Inter-Integrated Circuit ($I^2C$) serial bus (512) or Serial Peripheral Interface (SPI) (514) that are configured to transmit control data or instructions.

In operation, system 500 can accept image or other data from a vehicle or other source that arrives via the SPI interface 514. Successive images or video data can be stored in an image frame buffer 510. If no image data is available, one or more standby images held in a standby image buffer 511 can be directed to the image frame buffer 510. Such standby images can include, for example, an intensity and spatial pattern consistent with legally allowed low beam headlamp radiation patterns of a vehicle, or default light radiation patterns for architectural lighting or displays.

In operation, pixels in the images are used to define response of corresponding LED pixels in the active, with intensity and spatial modulation of LED pixels being based on the image(s). To reduce data rate issues, groups of pixels (e.g., 5×5 blocks) can be controlled as single blocks in some embodiments. In some embodiments, high speed and high data rate operation is supported, with pixel values from successive images able to be loaded as successive frames in an image sequence at a rate between 30 Hz and 100 Hz, with 60 Hz being typical. Pulse width modulation can be used to control each pixel to emit light in a pattern and with an intensity at least partially dependent on the image held in the image frame buffer 510.

In some embodiments, the system 500 can receive logic power via $V_{dd}$ and $V_{ss}$ pins. An active matrix receives power for LED array control by multiple VLED and $V_{Cathode}$ pins. The SPI 514 can provide full duplex mode communication using a master-slave architecture with a single master. The master device originates the frame for reading and writing.

Multiple slave devices are supported through selection with individual slave select (SS) lines. Input pins can include a Master Output Slave Input (MOSI), a Master Input Slave Output (MISO), a chip select (SC), and clock (CLK), all connected to the SPI interface 514. The SPI interface 514 connects to an address generator, frame buffer, and a standby frame buffer. Pixels can have parameters set and signals or power modified (e.g. by power gating before input to the frame buffer, or after output from the frame buffer via pulse width modulation or power gating) by a command and control module. The SPI interface 514 can be connected to an address generation module 518 that in turn provides row and address information to the active matrix 520. The address generator module 518 in turn can provide the frame buffer address to the frame buffer 510.

In some embodiments, the command-and-control module 516 can be externally controlled via an $I^2C$ serial bus 512. A clock (SCL) pin and data (SDA) pin with 7-bit addressing can be supported. The command-and-control module 516 can include a digital to analog converter (DAC) and two analog to digital converters (ADC). These are respectively used to set Vbias for a connected active matrix, help determine maximum $V_f$, and determine system temperature. Also connected are an oscillator (OSC) to set the pulse width modulation oscillation (PWMOSC) frequency for the active matrix 520. In one embodiment, a bypass line is also present to allow address of individual pixels or pixel blocks in the active matrix for diagnostic, calibration, or testing purposes. The active matrix 520 can be further supported by row and column select that is used to address individual pixels, which are supplied with a data line, a bypass line, a PWMOSC line, a Vbias line, and a $V_f$ line.

As will be understood, in some embodiments the described circuitry and active matrix LEDs 520 can be packaged and optionally include a submount or printed circuit board connected for powering and controlling light production by the semiconductor LED. In certain embodiments, the printed circuit board can also include electrical vias, heat sinks, ground planes, electrical traces, and flip chip or other mounting systems. The submount or printed circuit board may be formed of any suitable material, such as ceramic, silicon, aluminum, etc. If the submount material is conductive, an insulating layer is formed over the substrate material, and the metal electrode pattern is formed over the insulating layer. The submount can act as a mechanical support, providing an electrical interface between electrodes on the LED and a power supply, and also provide heat sinking.

In some embodiments, the active matrix 520 can be formed from light emitting elements of various types, sizes, and layouts. In one embodiment, one-or-two-dimensional matrix arrays of individually addressable light emitting diodes (LEDs) can be used. Commonly N×M arrays where N and M are respectively between two and one thousand can be used. Individual LED structures can have a square, rectangular, hexagonal, polygonal, circular, arcuate or other surface shape. Arrays of the LED assemblies or structures can be arranged in geometrically straight rows and columns, staggered rows or columns, curving lines, or semi-random or random layouts. LED assemblies can include multiple LEDs formed as individually addressable pixel arrays are also supported. In some embodiments, radial or other non-rectangular grid arrangements of conductive lines to the LED can be used. In other embodiments, curving, winding, serpentine, and/or other suitable non-linear arrangements of electrically conductive lines to the LEDs can be used.

In some embodiments, arrays of microLEDs (μLEDs or uLEDs) can be used. uLEDs can support high density pixels having a lateral dimension less than 100 μm by 100 μm. In some embodiments, uLEDs with dimensions of about 50 μm in diameter or width and smaller can be used. Such uLEDS can be used for the manufacture of color displays by aligning, in close proximity, uLEDs comprising red, blue, and green wavelengths. In other embodiments, uLEDS can be defined on a monolithic gallium nitride (GaN) or other semiconductor substrate, formed on segmented, partially, or fully divided semiconductor substrate, or individually formed or panel assembled as groupings of uLEDs. In some embodiments, the active matrix 520 can include small numbers of uLEDs positioned on substrates that are centimeter scale area or greater. In some embodiments, the active matrix 520 can support uLED pixel arrays with hundreds, thousands, or millions of LEDs positioned together on centimeter scale area substrates or smaller. In some embodiments, uLEDS can include LEDs sized between 30 microns and 500 microns. In some embodiments, each of the light emitting pixels in the light emitting pixel array can be positioned at least 1 millimeter apart to form a sparse LED array. In other embodiments sparse LED arrays of light emitting pixels can be positioned less than 1 millimeter apart and can be spaced apart by distances ranging from 30 microns to 500 microns. The LEDs can be embedded in a solid or a flexible substrate, which can be at least in part transparent. For example, the light emitting pixel arrays can be at least partially embedded in glass, ceramic, or polymeric materials.

Light emitting matrix pixel arrays, such as discussed herein, may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. The emitted light may be based at least in part on received sensor data and may be used for optical wireless communications. Associated optics may be distinct at a pixel, pixel block, or device level. An example light emitting pixel array may include a device having a commonly controlled central block of high intensity pixels with an associated common optic, whereas edge pixels may have individual optics. Common applications supported by light emitting pixel arrays include video lighting, automotive headlights, architectural and area illumination, street lighting, and informational displays.

Light emitting matrix pixel arrays may be used to selectively and adaptively illuminate buildings or areas for improved visual display or to reduce lighting costs. In addition, light emitting pixel arrays may be used to project media facades for decorative motion or video effects. In conjunction with tracking sensors and/or cameras, selective illumination of areas around pedestrians may be possible. Spectrally distinct pixels may be used to adjust the color temperature of lighting, as well as support wavelength specific horticultural illumination.

Street lighting is an application that may benefit from use of light emitting pixel arrays. A single light emitting array may be used to mimic various street light types, allowing, for example, switching between a Type I linear streetlight and a Type IV semicircular street light by appropriate activation or deactivation of selected pixels. In addition, street lighting costs may be lowered by adjusting light beam intensity or distribution according to environmental conditions or time of use. For example, light intensity and area of distribution may be reduced when pedestrians are not present. If pixels of the light emitting pixel array are spectrally distinct, the color temperature of the light may be adjusted according to respective daylight, twilight, or night conditions.

Light emitting arrays are also suited for supporting applications requiring direct or projected displays. For example, warning, emergency, or informational signs may all be displayed or projected using light emitting arrays. This allows, for example, color changing or flashing exit signs to be projected. If a light emitting array is composed of a large number of pixels, textual or numerical information may be presented. Directional arrows or similar indicators may also be provided.

Vehicle headlamps are a light emitting array application that requires large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In addition, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions. Some pixels may be used for optical wireless vehicle to vehicle communication.

An LED light module can include matrix LEDs, alone or in conjunction with primary or secondary optics, including lenses or reflectors. To reduce overall data management requirements, the light module can be limited to on/off functionality or switching between relatively few light intensity levels. Full pixel level control of light intensity is not necessarily supported.

In operation, pixels in the images are used to define response of corresponding LED pixels in the pixel module, with intensity and spatial modulation of LED pixels being based on the image(s). To reduce data rate issues, groups of pixels (e.g., 5×5 blocks) can be controlled as single blocks in some embodiments. High speed and high data rate operation is supported, with pixel values from successive images able to be loaded as successive frames in an image sequence at a rate between 30 Hz and 100 Hz, with 60 Hz being typical. In conjunction with a pulse width modulation module, each pixel in the pixel module can be operated to emit light in a pattern and with intensity at least partially dependent on the image held in the image frame buffer.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein. In those embodiments supporting software-controlled hardware, the methods, procedures, and implementations described herein may be realized in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

The invention claimed is:

1. A method of illumination, the method comprising:

causing lighting elements of an illumination device to produce light by:

defining a first group of lighting elements and a second group of lighting elements, with the first group of lighting elements including first lighting elements that draw an average current of a current at a Q point or greater and the second group of lighting elements including second lighting elements that draw an average current less than the current at the Q point, wherein the Q point is at a maximum external quantum efficiency (EQE) of an EQE versus current density curve for the lighting elements, and the average current is defined by an image to be provided by the lighting elements;

selectively modulating, by a digital to analog converter (DAC), an amplitude of a first signal provided to the first group of lighting elements, the first signal including a fixed duty cycle; and fixing, by a pulse width modulator (PWM), an amplitude of a second signal provided to the second group of lighting elements, the second signal including a modulated duty cycle.

2. The method of claim 1, wherein the first signal is a direct current (DC) mode 100% duty cycle signal.

3. The method of claim 1, wherein the amplitude of the first signal is set at Iampi*$D_i$, where Iampi is a current amplitude defined by the image and $D_i$ is the fixed duty cycle.

4. The method of claim 1, wherein the amplitude of the second signal is set at the Q point for the second lighting elements and the modulated duty cycle is set at $D_i$*Iampi/IQ, where Iampi is a current amplitude defined by the image, $D_i$ is a pixel duty cycle, and IQ is the current at the Q point of the EQE versus current density curve.

5. The method of claim 1, wherein additional groups of lighting elements are determined, each group of lighting elements having a defined range of pixel intensities.

6. The method of claim 1, wherein the lighting elements present the image provided by an image processing unit.

7. An illumination system comprising:

lighting elements;

control circuitry configured to control first and second distinct groups of the lighting elements, the first group of lighting elements including first lighting elements with an average current of a current at a Q point of the lighting elements or greater and the second group of lighting elements including second lighting elements with an average current less than the current at a Q point of the lighting elements, wherein the Q point is a maximum external quantum efficiency (EQE) of an EQE versus current curve for the lighting elements, and the average current is defined by an image to be provided by the lighting elements;

a digital to analog controller (DAC) configured to, under control of the control circuitry, selectively adjust amplitude of signals to the lighting elements; and a pulse width modulator (PWM) coupled to the DAC, the PWM configured to, under control of the control circuitry and with the DAC:

supply the first group of lighting elements with a first signal including a fixed duty cycle and a modulated amplitude, and supply the second group of lighting elements with a second signal with a fixed amplitude and a modulated duty cycle.

8. The illumination system of claim 7, wherein the first signal is a direct current (DC) mode 100% duty cycle signal.

9. The illumination system of claim 7, wherein the DAC further comprises multiple DAC units.

10. The illumination system of claim 7, further comprising an image processing unit configured to provide PWM and duty cycle data to the control circuitry, the PWM and duty cycle data, when implemented by the control circuitry, cause the lighting elements to present an image.

11. The illumination system of claim 7, further comprising more than two groups of lighting elements; wherein the DAC is able to, under control of the control circuitry, selectively adjust an amplitude of a respective signal provided to each of the more than two groups of lighting elements.

12. The illumination system of claim 7, wherein the amplitude of the second signal is less than the amplitude of the first signal.

13. The illumination system of claim 7, wherein the second signal has amplitude fixed to approach peak external quantum efficiency (EQE) and lower overall system power usage.

14. An illumination method comprising:

providing lighting elements that produce light;

providing a control circuit configured to control first and second distinct groups of the lighting elements, the first group of lighting elements including first lighting elements with an average current no less than a current at a Q point and the second group of lighting elements including second lighting elements with an average current less than the current at the Q point, wherein the Q point is at a maximum external quantum efficiency (EQE) of an EQE versus current density curve for the lighting elements, and the average current is defined by an image to be provided by the lighting elements;

supplying, by a pulse width modulator (PWM) and a digital to analog converter (DAC) and under control of the control circuit, the first group of lighting elements with a first signal that includes a fixed duty cycle and a modulated amplitude; and supplying, by the DAC and the PWM and under control of the control circuit, the second group of lighting elements with a second signal that includes a modulated duty cycle and a fixed amplitude.

15. The illumination method for an LED array of claim 14, wherein the first signal is a direct current (DC) mode 100% duty cycle signal.

16. The illumination method for an LED array of claim 14, wherein the image is provided by an image processing unit.

17. The illumination method for an LED array of claim 14, wherein the second signal has amplitude decreased and duty cycle increased with respect to the first signal.

18. The illumination method for an LED array of claim 14, wherein the second signal has amplitude decreased and duty cycle increased with respect to the first signal.

19. The illumination method for an LED array of claim 14, wherein additional groups of lighting elements are determined, each group of lighting elements having a defined, different signal amplitude from each other group of lighting elements.

* * * * *